United States Patent [19]

McClelland

[11] 3,826,982
[45] July 30, 1974

[54] INDICATOR CIRCUIT FOR MONITORING PULSES INITIATED IN A REMOTE METER READING SYSTEM

[75] Inventor: Theodore M. McClelland, Cary, N.C.

[73] Assignee: Westinghouse Electric Corporation, Pittsburgh, Pa.

[22] Filed: May 2, 1973

[21] Appl. No.: 356,668

[52] U.S. Cl................. 324/113, 324/157, 340/252
[51] Int. Cl............................................ G01r 13/04
[58] Field of Search.................. 324/157, 113, 137; 340/252 R, 253 C; 250/233

[56] References Cited
UNITED STATES PATENTS
3,148,329  9/1964  Lenethan............................ 324/113
3,673,607  6/1972  Hoeffel et al.................. 324/113 X Primary Examiner—Alfred E. Smith
Attorney, Agent, or Firm—R. W. Smith

[57] ABSTRACT

An indicator circuit for monitoring pulses initiated in a remote meter reading system includes a pair of light emitting diodes which are lit by the combined energization of the voltage section of an induction meter and the alternate positions of a pulse generating switch.

3 Claims, 2 Drawing Figures

PATENTED JUL 30 1974 3,826,982

3,826,982

INDICATOR CIRCUIT FOR MONITORING PULSES INITIATED IN A REMOTE METER READING SYSTEM

BACKGROUND OF THE INVENTION

This invention relates to an indicator circuit for monitoring pulses initiated in a remote meter reading system and more particularly to an improved indicator circuit for visually monitoring the combined operation of a watthour induction meter and a pulse generating switch responsive to movement of the meter.

The increased use of remote meter reading systems in measuring electrical power consumption has increased the requirements for quickly monitoring proper operation of the system equipment. In one telemetry system for remote meter reading, a pulse generator or pulse initiator is operated by a watthour induction meter to generate electrical pulses. One such system is described in U.S. Pat. No. 3,148,329 issued to B. E. Lenehan, Sept. 8, 1964, and assigned to the assignee of this invention, in which watthour meter measurements are converted into electrical pulses which in turn are recorded on a magnetic tape. The rate of the occurrence of these pulses is a measure of power consumption. Since the measurements of a large number of meters are often recorded, it is particularly desirable to provide a visual indication for quickly detecting any malfunction in the pulses being generated. The pulse recordings are typically made during month intervals and a malfunction may not be detected for such a recording period until the following month when the tapes are analyzed and computed. This can result in a loss of billing for more than a one month period due to a defective meter or pulse generating switch.

One type of pulse initiator used in remote watt-hour meter reading systems is disclosed in application Ser. No. 198,319, now U.S. Pat. No. 3,733,493, filed Nov. 12, 1971 and assigned to the assignee of this invention. The pulse initiator described in the aforementioned application includes an assembly which is mounted within the watthour meter housing and provides pulses at a rate proportional to the speed of the rotating meter disc in the watthour meter. Accordingly, it has been found desirable to readily and easily determine whether or not pulses are being generated from a remotely read meter normally connected to an associated recorder.

BRIEF DESCRIPTION OF THE INVENTION

In accordance with the present invention, an indicator circuit for monitoring pulses generated in a remote meter reading system includes an auxiliary secondary winding inductively coupled to the watthour meter voltage section and a pair of light emitting diodes connected between the secondary winding and the output contacts of a pulse generating switch. The light emitting diodes are poled in a blocking direction relative to a recorder input circuit so as to prevent current flow between the meter and recorder circuits.

It is a general feature of this invention to provide visual monitoring of the pulses generated at an induction meter without interfering with the operation of the meter or a pulse receiver connected to the meter. It is a further feature of this invention to provide visual indications of pulses generated from a pulse initiator and concurrently indicating malfunction of an induction meter connected to the pulse initiator in which the meter has a plurality of voltage sections and a failure of one section produces decreased meter indications. A still further feature of this invention is to provide a light emitting diode visual indicator circuit energized by the voltage section of a watthour meter and connected in common at the output of a pulse generating switch with the input to a magnetic recorder such that the recorder circuits and the meter circuits are mutually isolated. Other features and advantages of this invention will be apparent from a description of the drawings.

DESCRIPTION OF THE PREFERRED EMBODIMENT

Figure 1:
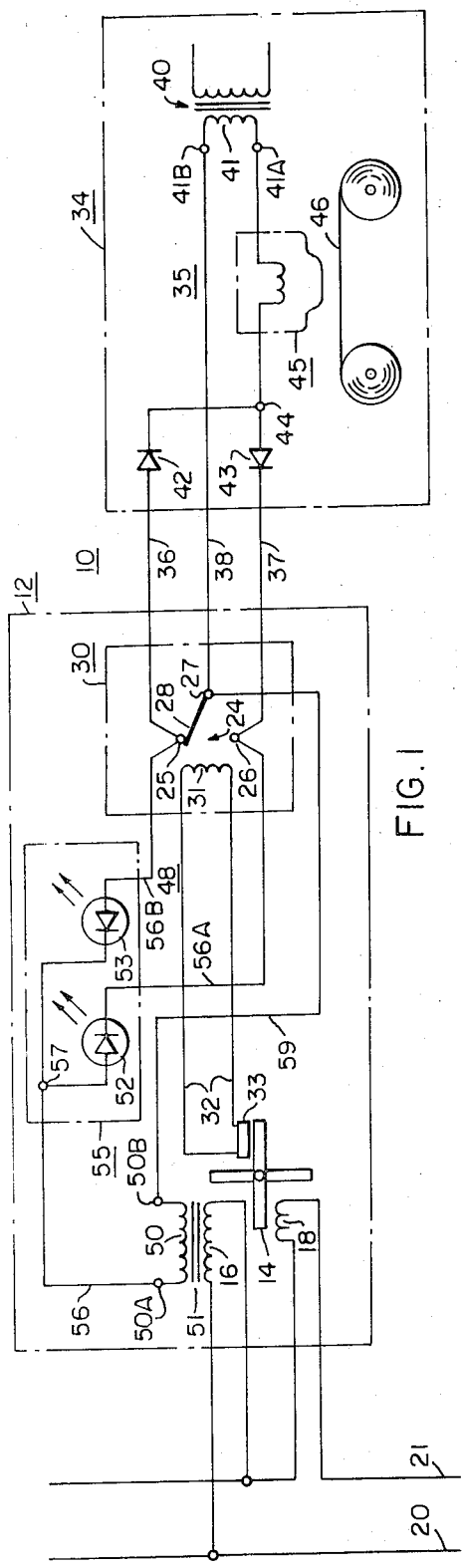
FIG. 1 illustrates a schematic circuit diagram of a remote meter reading system including a visual monitoring circuit for indicating pulses initiated by a pulse initiator and made in accordance with the present invention.

Referring now to the drawing and more particularly to FIG. 1, there is shown a remote meter reading system 10 including a meter 12 which is an integrating type induction watthour meter having a moving element formed by a rotatable electroconductive disc 14. The disc 14 is rotated by magnetic fields generated from the electromagnetic structure of the meter 12 including voltage and current sections including measuring windings 16 and 18, respectively. The disc 14 is rotated at a rate proportional to the electrical power delivered to an electrical load from a source through an external electrical circuit including single phase conductors 20 and 21. The meter measuring windings 16 and 18 are connected to the conductors 20 and 21 in accordance with the operation of a watthour meter as is understood by those skilled in the art.

The meter 12 includes a pulse initiator for producing electrical pulses at a rate responsive to the rate of rotation of the disc 14. The pulse initiator may be of the type disclosed in application Ser. No. 198,319, now U.S. Pat No. 3,733,493, filed Nov. 12, 1971, by Theodore M, McClelland, III and assigned to the assignee of this invention. As described in the aforementioned application, pulses are initiated from the meter 12 by a pulse generating switch 24 formed by a single pole double throw type of contact device utilized in three wire telemetry systems. The switch includes stationary output contacts 25, 26 and 27. A movable contact arm 28 is connected with the common contact 27 so that it is closed with either of the first and second contacts 25 and 26 by movement between an upper position, illustrated, and lower position. The switch 24 is included in a mercury wetted relay assembly 30 having a coil 31 actuating the contact arm 28. The arm is latched in either of the upper and lower contact engaging positions after being actuated by current flow in one of opposite directions through the coil 31.

The relay coil 31 is connected by a pulse initiating circuit, not shown, which may be as described in detail in the aforementioned application. Alternatively, the contact arm 28 can be mechanically linked to the shaft supporting the disc 14 for movement between the contacts 25 and 26. The pulse initiating circuit includes a radiometric sensing head 33 operable to energize the coil 31 in response to reflective indicia which are rotatable in response to the rotation of the disc 14. The contacts 25, 26 and 27 are connected to a separate pulse receiver 34 which includes a pulse-operated magnetic recorder circuit 35 in one preferred embodiment.

Conductors 36, 37 and 38 are connected to the contacts 25, 26 and 27, respectively, to provide the three wire telemetry circuit between the pulse initiator 23 and the pulse receiver circuit 35. An alternating current power supply 40 for the circuit 35 includes a stepdown transformer with an output secondary winding 41. The transformer input is connected to the same alternating current source as being measured by the meter 12 since normally the pulse receiver 34 is at the same location.

The input to the recorder circuit 35 that is connected to the conductor 36 includes a series connected diode 42 and the input connected with the conductor 37 includes a series connected diode 43 which is connected so as to have an opposite polarity to the diode 42 at a common circuit junction 44. Accordingly, the anode of the diode 43 and the cathode of the diode 42 are connected together at the common junction 44. This arrangement permits either diode to be connected in series with a magnetic recording head 45 of the recorder circuit 35 in response to the position of the contact arm 28. The recording head 45 in turn is connected to one terminal 41A of the output secondary winding 41 of the transformer of power supply 40. The conductor 38 connects the switch contact 27 directly to the other terminal 41B of the power supply secondary winding 41. This completes the recorder connection with the switch 24 so as to define the three wire telemetry connection therebetween.

With the connections as described above and when the contact arm 28 is in engagement with the contact 25, as shown in FIG. 1, the alternating current output of the power supply 40 is rectified by the diode 42. This provides pulses of one polarity through the recording head 45 while the contact arm 28 is latched to the contact 25. The diode 43 rectifies the alternating current output of the power supply 40 to produce an opposite polarity pulse through the recording head 45 when contact arm 28 is in the lower position to engage the contact 26. This provides oppositely magnetized pulses on a magnetic tape 46 as the contact arm 28 is actuated in response to rotation of the disc 14.

A visual indicator circuit 48, made in accordance with this invention, is connected to the switch contacts 25, 26 and 27. The indicator circuit 48 includes an auxiliary secondary coil winding 50 inductively coupled with the voltage winding 16. The winding 50 is wound on a common core structure 51 of the meter electromagnetic structure including the voltage winding 16 and the current winding 18. Accordingly, the secondary winding 50 develops a voltage across its output terminals 50A and 50B when the voltage winding 16 is energized to develop a magnetic flux for driving the disc 14.

First and second light emitting diodes 52 and 53 are mounted on a support plate 55 similar to that described in the U.S. application, Ser. No. 201,470, filed Nov. 23, 1971 by William J. Zisa et al and assigned to the assignee of this invention. As disclosed in the aforementioned application, the support plate 55 is mounted adjacent the front viewing area of the meter 12 beside a name plate and a dial plate associated with a mechanical register, not shown, of the meter 12 so as to be directly viewable from the front of the meter.

The first light emitting diode 52 is connected in series with the winding terminal 50A through conductor 56 at a junction 57 therewith and to the switch contact 26 through conductor 56A. The second light emitting diode 53 is connected in series with the junction 57 and the conductor 56B which is connected to the switch contact 25. The electrodes of the light emitting diodes 52 and 53 are oppositely poled relative to their common connection at the junction 57. In FIG. 1, the anode electrode of the light emitting diode 52 and the cathode electrode of the light emitting diode 53 are shown oriented toward each other for connection to the junction 57. The indicator circuit 48 is completed by connecting the switch contact 27 to the secondary winding terminal 50B through a conductor 59. Accordingly, the alternate positions of the contact arm 28 connects either of the light emitting diodes across the secondary winding 50.

The switch contacts 25, 26 and 27 form common junctions between the indicator circuit 48 and the recorder circuit 35. It is important to afford isolation between these circuits by connecting the same polarity of the light emitting diode 52 and of the diode 42 to the contact 26, similarly, the same polarity of the light emitting diode 53 and that of the diode 43 are connected to the contact 25. This arrangement blocks current of the secondary winding 50 from reaching the recorder circuit 35 and current from the power supply 40 from reaching the indicator circuit 48 as explained more fully hereinbelow.

In operation of the indicator circuit 48, illustrated in FIG. 1, the disc 14 is rotated in response to the electrical power flowing through the conductors 20 and 21 to periodically actuate the sensing head 33 and the associated pulse initiator 23 to energize the relay coil 31. When the contact arm 28 is in the upper position so as to engage the contact 25, rectified positive pulses are applied through the diode 42 and to the magnetic recording head 45, as noted hereinabove. This establishes a positive current flow through the conductor 36 since the negative half cycles of the power supply 40 are blocked from the record head 45. Also, in this position of the contact arm 28 a completed circuit loop is formed from the secondary winding 50 through the light emitting diode 53. Alternate voltage half cycles light the diode 52 when the winding terminal 50A is negative relative to the terminal 50B, due to the rectifying characteristics of light emitting diodes. Accordingly, there is provided visual indication that magnetic pulses of one polarity are being initiated by the switch 24 and that the electromagnetic metering elements of the watthour meter 12 are operating.

When the contact arm 28 is actuated to engage contact 26, negative rectified current is developed through the conductor 37 by the diode 42 in the recorder circuit 35. Thus, opposite polarity pulses are produced by the record head 45 on the magnetic tape 46. The lower contact arm position causes the indicator circuit 48 to light the light emitting diode 52 during half cycles when the winding terminal 50A is poled positive relative to the terminal 50B. Accordingly, either of two energized circuit loops are formed between the winding terminals 50A and 50B and the conductors 56 and 59, respectively, including one of the light emitting diodes 52 or 53.

It is important that the recorder and indicator circuits 35 and 48 are electrically isolated even though they are interconnected at the switch contacts 25, 26 and 27. This is provided by the arrangement of the polarities of the light emitting diodes 52 and 53 relative to the diodes 42 and 43 and also the short circuiting effect of the contact arm 28 switch closures. The closing of the contact arm 28 forms an actual short circuit across the common connections, either contacts 27 and 25 or 27 and 26, since current of each of the energized portions of the recorder or indicator circuit 35 or 48 is shunted past the other of the energized circuit portions through contact arm 28. For example, when the contact arm 28 closes with contacts 27 and 25, the current from the winding 50 which passes through the light emitting diode 53 in its forward direction bypasses the conductors 36 and 38 since the contacts 27 and 25 are short circuited. Correspondingly, the current from the transformer secondary 41 in the forward direction of the diode 42 bypasses the energized indicator circuit loop including conductors 56B and 59 and light emitting diode 53 because the contacts 25 and 27 are short circuited in these loops. This isolates the energized portions of the indicator circuit 48 and of the recording circuit 35.

The non-energized portions of the circuits 35 and 48 are connected together at the open switch terminals which are not being closed by the contact arm 28, for example, the contacts 26 and 27 in the example described immediately above. When the transformer secondary 41 develops half-wave voltage cycles in the forward biasing direction of the diode 43, this biases the switch contact 26 positive with respect to the contact 27. Current is blocked from flowing into the indicator circuit 48 and winding 50, which could alter the metering voltage across the voltage winding 16, by the reverse current blocking characteristics of the light emitting diode 52.

When the secondary winding 50 develops an alternate half voltage cycle in the direction of the forward polarity of the light emitting diode 53, the contact 26 is poled positive relative to the contact 27. Current is blocked from flowing from the indicator circuit 48 and into the recording circuit 35 by the blocking characteristics of the diode 43. As the voltages of the windings 41 and 50 reverse from the directions just described, current flows in the respective circuit loops of the recording and indicator circuits including diode 42 and light emitting diode 53. The current of one circuit does not flow into the other circuit due to the short circuit formed by the contact arm 28 across the common connections therebetween, as described hereinabove.

The ratings of the light emitting diodes 52 and 53 and the diodes 42 and 43 are to be provided such that they have reverse voltage and current blocking characteristics sufficiently high to block the voltage and current outputs of either of the windings 41 and 50. When the pulse initiator 23 is assembled to a watthour meter already having the indicator circuit 48 with the light emitting diodes 52 and 53 energized from a winding 50 output in the order of one to two volts as described in the aforementioned application Ser. No. 201,470 it may be connected to a recording circuit 35 having a substantially higher voltage output. Accordingly, the light emitting diodes may not have a sufficient reverse voltage and current blocking characteristics. In this case additional conventional diodes, for example, ones corresponding to the rating of those used for the diodes 42 and 43 can be connected in series with light emitting diodes 52 and 53, as described for the embodiment shown in FIG. 2.

Upon failure of the switch 24 to provide proper contact so as to render the recorder circuit operative to energize the record head 45, concurrently, current will not flow through the indicator circuit 48 and the light emitting diodes 52 and 53 will not be energized. This indicates a malfunction of the switch 24. Also, a failure in the watthour meter 12 that prevents generation of magnetic flux from the voltage winding 16 and energization of the secondary winding 50 also causes the light emitting diodes 52 or 53 not to be lit.

This is of particular significance in the case of a watthour meter having a plurality of current sections as described in connection with the description of the indicator circuits shown in FIG. 2.

Figure 2:
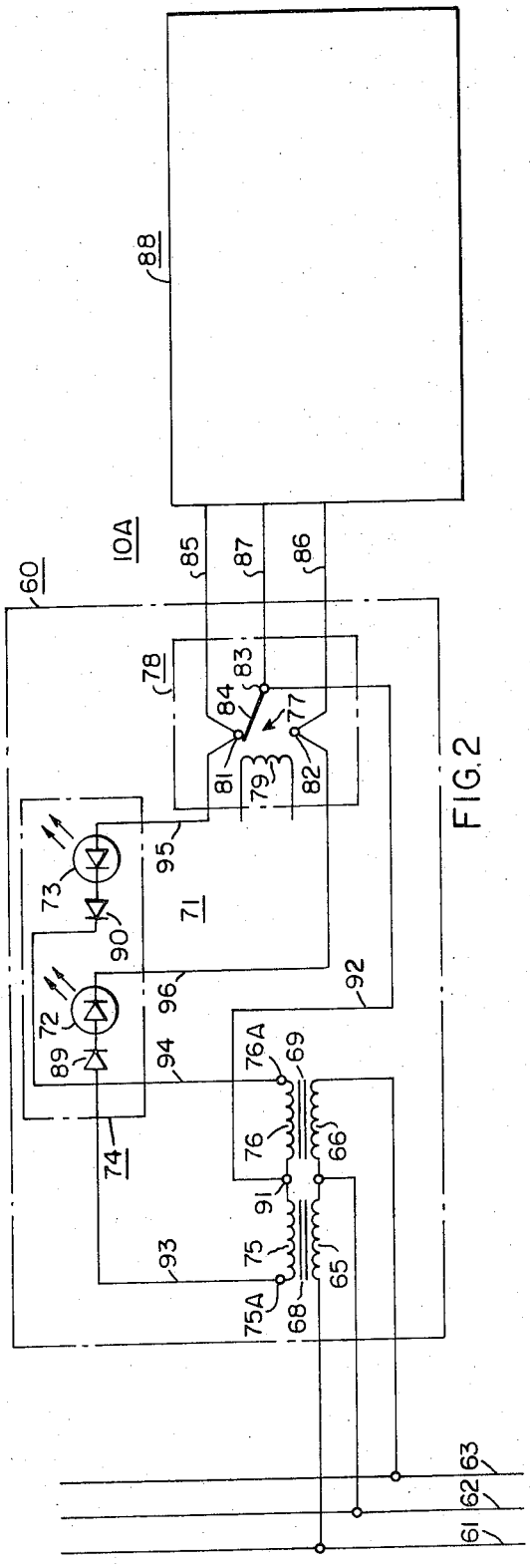
FIG. 2 illustrates another embodiment of the remote meter reading system shown in FIG. 1 that includes an alternative embodiment of the present invention.

Referring now to FIG. 2, there is shown an alternative embodiment of a remote meter reading system 10A having a watthour meter 60 including an electromagnetic structure of the multistator type such as used to meter power on three or more conductors, such as 61, 62 and 63 provided in three-wire single phase and polyphase power circuits. Voltage windings 65 and 66 provided on separate cores 68 and 69, respectively, which define the separate stators. An indicator circuit 71, which is another embodiment of this invention, includes light emitting diodes 72 and 73 corresponding to the light emitting diodes 52 and 53 shown in FIG. 1. These light emitting diodes 72 and 73 are carried by a support plate 74 and are connected in the circuit 71 with secondary windings 75 and 76 and a pulse generating switch 77 of a relay assembly 78 corresponding to the relay assembly 30 shown in FIG. 1. The secondary windings 75 and 76 are inductively coupled to the voltage windings 65 and 66, respectively, as described for winding 50 hereinabove. A coil 78 is connected to a pulse initiating circuit, not shown, responsive to disc movement of the meter 60 in a manner corresponding to the operation of the coil 31 shown in FIG. 1.

Output contacts 81, 82 and 83 provide pulses in response to movement of a switch contact arm 84. These pulses are applied through the three wire telemetry conductors 85, 86 and 87. These conductors are connectable to a pulse receiver 88 operable, as described hereinabove, as is the pulse receiver 34. Accordingly, the conductors 85, 86 and 87 are connected to the switch contacts 81, 82 and 83, respectively.

The receiver 88 has a recorder circuit including a power supply which produces an output voltage higher than the outputs of the secondary windings 75 and 76. For example, there is an output in the order of two volts at each of windings 75 and 76 and a voltage greater by several magnitudes, for example, in the order of forty volts is developed between the conductor 86 and either of the conductors 85 or 87. The light emitting diodes 72 and 73 are nominally rated to be lighted and have reverse voltage and current blocking characteristics corresponding to the output of the windings 75 and 76 which are substantially below the voltages applied to the switch 77 by the pulse receiver 88.

Conventional diodes 89 and 90 are connected in series aiding relationship with the light emitting diodes 72 and 73. The reverse current and voltage blocking characteristics of the diodes 89 ad 90 add to those of the light emitting diodes 72 and 73 to block the voltage and current of the conductors 85, 86 and 87 from the indicator circuit 71 described in detail hereinafter. and In the detail connections of the indicator circuit 71 the secondary windings have commonly connected terminals which are connected together at a junction 91. The common switch contact 83 is connected by the conductor 92 to the junction 91. The secondary winding terminals 75A and 76A are separately connected via the conductors 93 and 94 to the series arrangements of the diodes 89 and 72 and 90 and 73, respectively, such that the arrangements have the opposite polarity relationships to each other as shown. The arrangements of the diodes 89 and 72 and 90 and 73 are separately connected by the conductors 95 and 96 to the switch contacts 81 and 82, respectively to complete the indicator circuit 71.

In operation of the indicator circuit 71, the relay assembly 78 initiates pulses through the conductors 85, 86 and 87 in response to meter movement of the meter 60 as described hereinabove. The light emitting diode 73 is lit when the contact arm 84 is in the upper position by each half voltage cycle when the winding terminal 76A is negative relative to the junction 91. The light emitting diode 72 is lit when the arm 84 is in the lower position by each half voltage cycle when the winding terminal 75A is positive relative to the junction 91. The winding 75 exclusively lights the light emitting diode 72 and the winding 76 exclusively lights the light emitting diode 73. Thus, each of the light emitting diodes 72 and 73 is lit in response to the proper pulse initiating contact positions of the switch 77 and proper operation of the voltage sections of each of the stators having the associated voltage winding 65 or 66.

The conventional diodes 89 and 90 aid the light emitting diodes 72 and 73 in blocking the voltage and current applied between contacts 81 and 83 and 82 and 83. Accordingly, when the contact 81 is negative or when the contact 82 is positive relative to the contact 83 due to the potentials developed on conductors 85, 86 and 87 by an amount which exceeds the blocking characteristics of the light emitting diodes 72 ad 73, the blocking characteristics of the diodes 89 and 90 are selected to provide the additionally required characteristics. This isolates the indicator circuit 71 from the circuit of the receiver 88.

When a recorder circuit such the circuit 35 shown in FIG. 1 is provided in the pulse receiver 88 and the conductor 85, 86 and 87 are connected as are the conductors 36, 37 and 38, the characteristics of diodes 89 and 90 may conveniently match the characteristics of the diodes 42 and 43. In this instance diodes corresponding to the diodes 42 and 43 block the outputs of the secondary windings 75 and 76 so as to provide isolation of the pulse receiver 88 in the same manner as described hereinabove for FIG. 1 to complete the isolation between the circuits of the meter 60 and pulse receiver 88.

While the embodiments of the indicator circuits 48 and 71 constitute preferred ones of this invention it is contemplated that modifications may be within the spirit and scope of this invention.

What is claimed is:

1. An indicator circuit for monitoring a three wire remote meter reading telemetry system wherein the system includes a watthour induction meter having a measuring winding means, a switch having first and second closing contacts for effecting alternate closures with a common contact in response to movement of said meter, and a remote receiver circuit including a source of alternating current and a pair of diodes, each of said diodes being connected in a mutually opposite polarity relationship between said source and one of said closing contacts to develop positive and negative pulse signals in response to the alternate switch closures, said indicator circuit comprising: first and second light emitting diodes mounted on said meter, said first light emitting diode having one electrode of a given polarity connected to said first closing contact and said second light emitting diode having one electrode of an opposite polarity connected to said second closing contact, the electrode of the light emitting diode and the electrode of the diode of said pair which are commonly connected to the same closing contact being of mutually opposite polarities; and an auxiliary winding means inductively coupled to said measuring winding means and being connected between the remaining electrodes of said first and second light emitting diodes and said common contact so that upon excitation of said auxiliary winding means the light emitting diodes are separately energized so as to visually display at said meter an indication correspondingly responsive to each of the alternate switch closures and currently responsive to the proper operation of said measuring winding means with the reverse current blocking characteristics of said light emitting diodes being poled so as to prevent current of said alternating current source from flowing into said indicator circuit.

2. The indicator circuit as claimed in claim 1 wherein said measuring winding means includes a plurality of separate coil windings; wherein said auxiliary winding means includes first and second coil windings being separately inductively coupled to separate ones of the measuring coil windings with said first and second coil windings being connected between separate ones of said remaining electrodes of said first and second light emitting diodes, respectively, and said common contact.

3. The indicator circuit as claimed in claim 2 including a further pair of diodes with each of said further pair of diodes being connected in series aiding relationship with one of said first and second light emitting diodes, respectively, so as to aid the reverse current blocking characteristics of the light emitting diodes to further substantially block current flow from the alternating current source of said remote receiver circuit.

* * * * *